United States Patent [19]

Cleusix

[11] 4,262,223

[45] Apr. 14, 1981

[54] ELECTRO-MAGNETIC MOTOR FOR TIMEPIECE

[75] Inventor: Willy Cleusix, Le Landeron, Switzerland

[73] Assignee: Ebauches Electroniques S.A., Neuchatel, Switzerland

[21] Appl. No.: 969,539

[22] Filed: Dec. 14, 1978

[30] Foreign Application Priority Data

Dec. 20, 1977 [CH] Switzerland .................. 15723/77

[51] Int. Cl.³ .......................................... H02K 37/00
[52] U.S. Cl. ................................ 310/49 R; 310/163; 310/193; 368/76
[58] Field of Search ..................... 310/49, 162–165, 310/190–193; 58/23 D

[56] References Cited

U.S. PATENT DOCUMENTS

| 2,752,517 | 6/1956 | Von Delden | 310/163 X |
| 2,792,510 | 5/1957 | DeWolf | 310/163 |
| 3,052,806 | 9/1962 | Lee | 310/163 X |
| 3,949,251 | 4/1976 | Takatsuki | 310/49 |

Primary Examiner—Donovan F. Duggan
Attorney, Agent, or Firm—Silverman, Cass & Singer, Ltd.

[57] ABSTRACT

An electro-magnetic motor for a timepiece wherein the stator is formed of two pole pieces contacting the ends of a core traversing a coil. Both ends of the core and one end of each pole piece have notched portions with cross sections of the notched portions of the core being at least equal to the cross section of core as it passes through the coil and cross sections of the notched portions of the pole pieces being substantially equal to the cross sections of the notched portions of the core, so that the notched portions do not produce an increase in the resistance to the passage of magnetic flux through the core and pole pieces.

4 Claims, 2 Drawing Figures

ELECTRO-MAGNETIC MOTOR FOR TIMEPIECE

BACKGROUND OF THE INVENTION

The present invention relates to an electromagnetic motor for a timepiece, the motor including a stator which comprises a cylindrical coil, a core traversing the coil, two pole pieces respectively in contact with the ends of the core, and a rotor arranged between the pole pieces.

The drawback in motors of the above mentioned type in that the median plane of the pole pieces does not pass through the axis of the core, that is to say through the axis of the coil, the pole pieces being applied against or under the ends of the core. Hence, if one does not desire the movable elements of the movement, such as the rotor of the motor and the gearing to go beyond the top of the coil, there is on one side of the pole pieces only a space which is smaller than half the thickness of the coil.

There has suggested for removing this drawback an arrangement according to which the ends of the core traversing the coil are each provided with a notch. The ends of the pole pieces in contact with the core are each provided with a notch, and the assembling of the core and the pole pieces being effected by reciprocal engagement of the notched portions.

However, the drawback of such arrangement is that at the place a location of these notches, the section of the core is lower than the section of saturation so that the notch produces an increase in the resistance to the passage of the magnetic flux.

The purpose of the present invention is to furnish a construction in which the median plane of the pole pieces is closer to the axis of the core of the coil than in the conventional construction without, however, the connection between the ends of the core and the pole pieces producing an increase of the resistance to the passage of the magnetic flux.

SUMMARY OF THE INVENTION

To this effect, the electro-magnetic motor according to the invention is characterized by the fact that the two ends of the core are provided with a widening portion, the dimension of which is such that at the location of the notch a section at least equal to the section of saturation of the core is realized, so that the notch does not produce any increase in the resistance to the passage of the magnetic flux.

BRIEF DESCRIPTION OF THE DRAWING

The drawing shows, by way of example, one embodiment of the invention.

BRIEF DESCRIPTION OF THE PREFERRED EMBODIMENT

Figure 1:
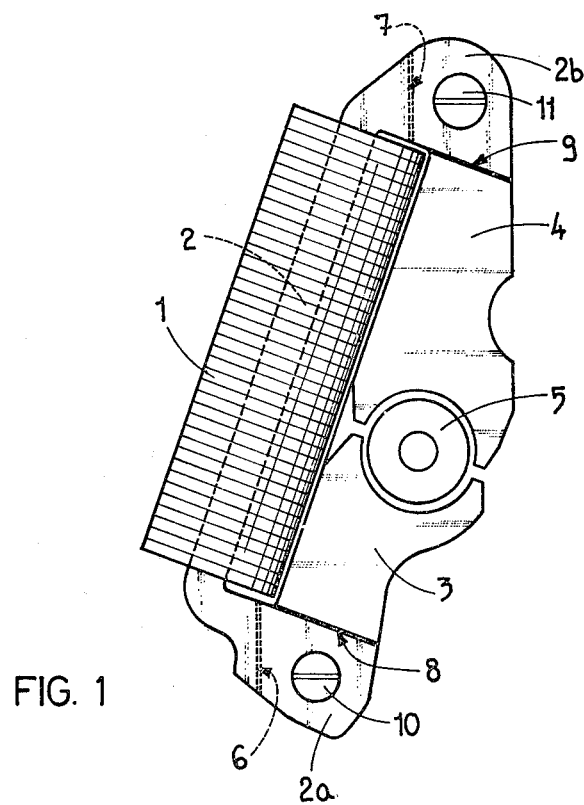
FIG. 1 is a plan view of an electro-magnetic motor for a timepiece.
Figure 2:
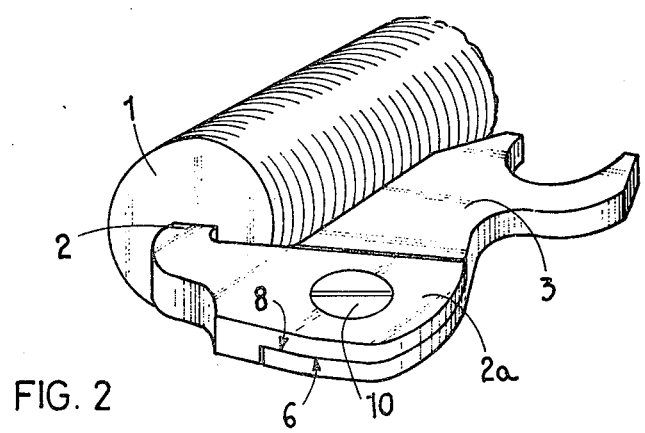
FIG. 2 is a partial perspective view thereof, at a larger scale.

The motor represented in FIG. 1 comprises a cylindrical coil 1 traversed by a core 2. Core 2 is made of soft iron, has a substantially square cross section and is terminated at its two extremities or ends, by two ears 2a and 2b. The ear 2a is in contact with one of the pole pieces 3 of the stator of the motor and against which it is applied. The ear 2b is in contact with the second pole piece, 4 of the stator of the motor and against which it is applied.

The rotor of the motor carries a permanent magnet and rotates between the two pole pieces 3 and 4.

The two ears 2a and 2b are each provided with a notch, respectively indicated as 6 and 7, extending to half the thickness of the ears, while each of the pole pieces 3 and 4 are provided with a notch, respectively indicated as 8 and 9, also extending half the thickness of the pieces. The pole piece 3 is secured to the ear 2a by reciprocal engagement of the notched portions 4 and 8, while the pole piece 6 is secured to the ear 2b by reciprocal engagement of the notched portions 7 and 9. Screws 10 and 11, respectively ensure the assembly of these parts.

It results from this arrangement that the median plane of the pole pieces 3 and 4, being situated at half the thickness of the pole pieces, passes through the geometrical axis of the coil 1.

So that there is no increase in the resistance to the passage of the magnetic flux at the place of the notches 6 and 7 which are provided in the ears 2a and 2b and which terminate the core 2, the increased resistance being otherwise due to the reduction of the section produced by the notches, the ears are dimensioned so that an increase of their width compensates for the reduction in their height due to the notches. The arrangement is such that a cross section of the ears 2a and 2b passing through the notches is at least equal to the section of the core 2 in the coil, that is to say higher or greater than the section of saturation.

Owing to this arrangement, the plane of the rotor 5 corresponding to the median plane of the pole pieces 3 and 4 passes through the axis of the coil 1, so that one has available on both sides of the rotor, a height corresponding substantially to the radius of the coil for locating therein mechanical elements of the movement of the watch without these elements having to extend beyond the upper and lower levels of the coil.

It is to be noted that it is not necessary that the notches of the ears of the core of the coil and of the pole pieces extend to half the thickness of these elements. In the case where the designer of the watch does not need a space equal to half the height of the coil for the gearing of the movement, one could make the notches a height less than half the thickness of the ears and of the pole pieces, in which case these notches would have the effect of bringing close to each other the median plane of the pole pieces and the geometric axis of the core, without bringing them however, to pass through the core.

What I claim is:

1. An electro-magnetic motor for a timepiece, comprising:
    A. a stator including:
    (1) a cylindrical coil;
    (2) a core traversing the coil and having opposed ends, each of which are provided with notched portions having notches therein, the notched portions being wider than the remainder of the core and having a cross section at least equal to the section of the core in the coil;
    (3) two pole pieces having opposed ends with one end of each pole piece in contact with an end of the core, the pole pieces each having a notched portion with a notch on the one end thereof, the notched portions of the pole pieces having a cross section substantially equal to the cross section of the notched portions of the core and the notched portions of the pole pieces being assembled to the notched portions of the core by reciprocal engagement thereof to bring one end of each pole piece in contact with an end of the core, the other ends of the pole pieces extending towards one another; and B. a rotor arranged between the other ends of the pole pieces;

C. so that the notches in the core and the pole pieces do not produce any increase in the resistance to the magnetic flux passing through the core and the pole pieces.

2. The motor as claimed in claim 1 in which pole pieces have median planes extending halfway through their thickness and the notches of the core and pole pieces extend substantially to half the thickness of their respective core and pole pieces so that the median plane of the pole pieces passes through the axis of the coil.

3. The motor as claimed in claim 2 in which the notched portions of the core and pole pieces respectively have a thickness which is less than the thickness of the remainder of their core and pole pieces.

4. The motor as claimed in claim 3 in which the notched portions of the core and pole pieces have flat top and bottom side surfaces and the top side surface of one of the core and pole pieces is in contact with the bottom side surface of the other of the core and pole pieces.

* * * * *